United States Patent [19]

Sanders et al.

[11] Patent Number: 5,267,309

[45] Date of Patent: Nov. 30, 1993

[54] TELEPHONE LINE UNIT HAVING PROGRAMMABLE READ-ONLY MEMORY

[75] Inventors: Gus C. Sanders; Richard R. Rzonca; Richard M. Czerwiec; Claude M. Hurlocker, all of Raleigh, N.C.; Benjamin M. Rice, Newport, R.I.; Michael J. Gingell, Raleigh, N.C.

[73] Assignee: Alcatel Network Systems, Inc., Richardson, Tex.

[21] Appl. No.: 616,175

[22] Filed: Nov. 20, 1990

[51] Int. Cl.⁵ ............................................ H04Q 11/04
[52] U.S. Cl. ..................................... 379/399; 379/400;
  379/382; 379/377; 379/212; 379/20; 370/67
[58] Field of Search ............... 379/399, 400, 443, 188,
  379/12, 382, 377, 212, 201; 370/67, 85.1

[56] References Cited

U.S. PATENT DOCUMENTS

| | | | |
|---|---|---|---|
| 3,826,876 | 7/1974 | Gueldenpfenning et al. | 379/188 |
| 4,081,613 | 3/1978 | Reines et al. | 379/382 X |
| 4,232,199 | 11/1980 | Boatwright et al. | 379/201 X |
| 4,232,293 | 11/1980 | Harris | 379/443 X |
| 4,270,027 | 5/1981 | Agrawal et al. | 379/377 X |
| 4,706,270 | 11/1987 | Astegiano et al. | 379/201 X |
| 4,805,209 | 2/1989 | Baker, Jr. et al. | 379/212 X |
| 4,993,019 | 2/1991 | Cole et al. | 370/67 |
| 5,001,741 | 3/1991 | Sayer | 379/12 |
| 5,088,089 | 2/1992 | Gingell et al. | 370/85.1 |

Primary Examiner—James L. Dwyer
Assistant Examiner—M. Shehata
Attorney, Agent, or Firm—Ware, Fressola, Van Der Sluys & Adolphson

[57] ABSTRACT

A line unit, used in a line shelf having a line shelf processor and common logic, is provided with an EEPROM device for storing information relative to the line unit. The stored information includes line unit type identification codes, auto provisioning data, gain and equalization adjustment data and signaling translation tables. The data contained within the EEPROM may be utilized by the line shelf processor to provide automatic initialization and provisioning of the line unit when first inserted into the line shelf, and automatic signaling translation so that line unit signaling becomes compatible with a transmission facility connected to the line shelf. The need for factory preset resistors installed in the line unit may be eliminated by storing within the EEPROM a required gain setting.

9 Claims, 3 Drawing Sheets

TELEPHONE LINE UNIT HAVING PROGRAMMABLE READ-ONLY MEMORY

BACKGROUND OF THE INVENTION

1. Field of the Invention

The present invention relates to telephone systems and more particularly to a line shelf arrangement having pluggable cards providing common logic, a line shelf processor and a plurality of line units, wherein the various cards used in the line shelf have programmable read-only memory for storing specific information concerning the card on which it is mounted.

2. Description of the Prior Art

Telephone systems utilize line shelves as an interface between higher-speed PCM transmission facilities and two-wire or four-wire subscriber lines. In a typical configuration, a line shelf can accommodate up to 48 individual line units, with each unit servicing up to two subscribers.

With improved technology, telephone companies have been offering enhanced telephone service to various types of subscribers. In most cases, the services require unique and different types of line units. In many instances, the line units have substantially similar circuit construction but require different software to perform the designated service. In other instances, similar types of units require different gain or equalization adjustments depending upon the particular installation and the subscriber's needs.

Thus, telephone operating companies must have an inventory of many different types of line units for the various services offered, with different software, gain and equalization adjustments being required on each of the different types of units. The inventory problem is clearly becoming unmanageable.

It is possible to inventory units without software or gain and equalization adjustments, but then the installation requirements become cumbersome, in that for each newly-installed or replaced unit, the appropriate software must be loaded into the unit depending upon the particular type of unit and the service being rendered. The gain and equalization requirements for the subscriber circuit must be adjusted in the field, and this is extremely difficult.

In four-wire type units, the components used therein, particularly transformers, do not have very close tolerances. Wide variations in transformer loss are experienced. Accordingly, gain and equalization adjustments are performed during factory testing. Typically, a completed unit is inserted into a tester and a specific gain resistor is selected and manually inserted into the unit. In like manner, equalization is also adjusted. Such procedures significantly increased manufacturing costs of line units.

With the advent of many different types of telecommunications service, various signaling schemes have been devised which are not compatible with each other. Various signaling schemes use what is commonly known in the industry as A, AB or ABCD type signaling. Signaling translation is required between equipment using different signaling schemes. Special signaling translation circuits for each different type of service were developed. Thus, the free interchange of line units is restricted, in that various types of line units are specifically provided for each service to be compatible with the signaling of the transmission facility. As an example, if ten different types of line units existed to provide ten different types of service and were to be used with transmission facilities of five different vendors, it is possible that 50 different types of line units would have to be manufactured to provide full service for all vendor service combinations. Again, this created an inventory nightmare.

Thus, it was apparent that improvements were required to reduce manufacturing costs, the inventory burden and the manpower required for installing and replacing line units.

SUMMARY OF THE INVENTION

The present invention contemplates a unique line unit structure for use in a typical line shelf which will significantly reduce manufacturing costs of line units, lower the inventory level requirements for operating companies, and simplify the procedures necessary for installing or replacing line units. Signaling translation will not require special circuitry on each line unit that must be compatible with the transmission system with which it will be used. Gain and equalization requirements will be programmed into the unit, and software provisioning will be automatic. On each line unit, there is provided a programmable read-only memory or other memory type device which stores information relevant to that specific line unit.

It is contemplated that the memory will store such information as line unit identification in the form of a CLEI code and serial number, gain and equalization settings, circuit default settings, signaling translation tables and an installation date, so that mean time between failures can be easily determined. The CLEI code is a Common Language Equipment Identification Code assigned by Bellcore to all equipment provided by a supplier.

Through the use of this simple memory device, provisioning of a newly-installed or replaced unit of any type may be fully automated, thereby eliminating the requirement for preloading software into a unit prior to installation into the line shelf. Such a procedure will eliminate the requirement for the installer to consult documentation, load software and set various microswitches manually on each line unit. Thus, significant time and money will be saved, and the possibility of errors will be significantly reduced.

The requirement for factory selection of trim resistors may be eliminated through the use of electronic gain control, with the gain requirement being stored in the memory.

Signaling translation tables can be downloaded from the line unit memory and combined with translation tables for other line units in a common logic circuit for the line shelf. The signaling for each PCM channel can then be automatically translated to be compatible with the transmission facility to which the line shelf is connected.

It is contemplated that a line shelf will include a line shelf processor, line shelf common logic, a power supply and a plurality of line units. The line units are connected to the common logic via a plurality of buses for conveying PCM data, signaling, configuration data, provisioning data and PROM memory data. The line shelf common logic is connected to the line shelf processor, thereby allowing the processor to communicate with all of the line units.

Each line unit generates and receives PCM data and signaling over the afore-mentioned buses, said data and signaling being multiplexed into time channels on the buses by means of tri-state buffers. In the common logic, predetermined channel-specific operations are performed before the data goes to the outside world on a PCM transmission facility, such as a T1 span or higher-order multiplex system, such as SONET.

The line shelf processor is capable of reading the contents of the line unit PROM via the PROM memory bus through the common logic. The processor scans all possible line unit positions, attempting to read the PROMs. When a line unit is plugged in, the processor reads the PROM, determines the type of line unit that is inserted in a particular slot, and thereafter initiates the initialization and provisioning software routines for the installed unit. A configuration bus transmits configuration data to the line units from the processor to activate a selected line unit and its associated PROM during a particular channel. The processor can then address other data stored in the PROM and can then fully provision the line unit with the necessary software, including such things as selectable balance networks, gain and equalization controls, time slot assignment, performance monitoring thresholds for ISDN, etc. All of this can be accomplished automatically without human intervention.

The processor may selectively read translation data from the PROM and write it to a RAM memory contained within the common logic where the translation data is stored on a per-channel basis for the various channels served by the common logic. Thus, a perchannel translation table is provided for translating signaling between the line unit and the transmission facility. Signaling translation is simplified, and specific signaling translation circuitry is not required on each line unit for each type of transmission system.

A primary objective of the present invention is to provide memory on a line unit for storing specific information relating to the line unit.

Another objective of the present invention is to provide a system for automatic provisioning of line units.

Another objective of the present invention is to provide for automatic gain and equalization adjustments of line units.

Another objective of the present invention is to provide for universal signaling translation between line units and transmission facilities.

Another objective of the present invention is to provide a means for determining line unit operating time.

Another objective of the present invention is to provide a means for programming default settings for provisionable features in a line unit.

DETAILED DESCRIPTION OF THE INVENTION

The present invention is contemplated for use in a line shelf of a DLC access product and specifically in a line circuit for interfacing DS0 subscriber lines with a transmission facility, such as a DS1-level transmission line or higher-order electrical or optical transmission system, such as SONET.

Figure 1:
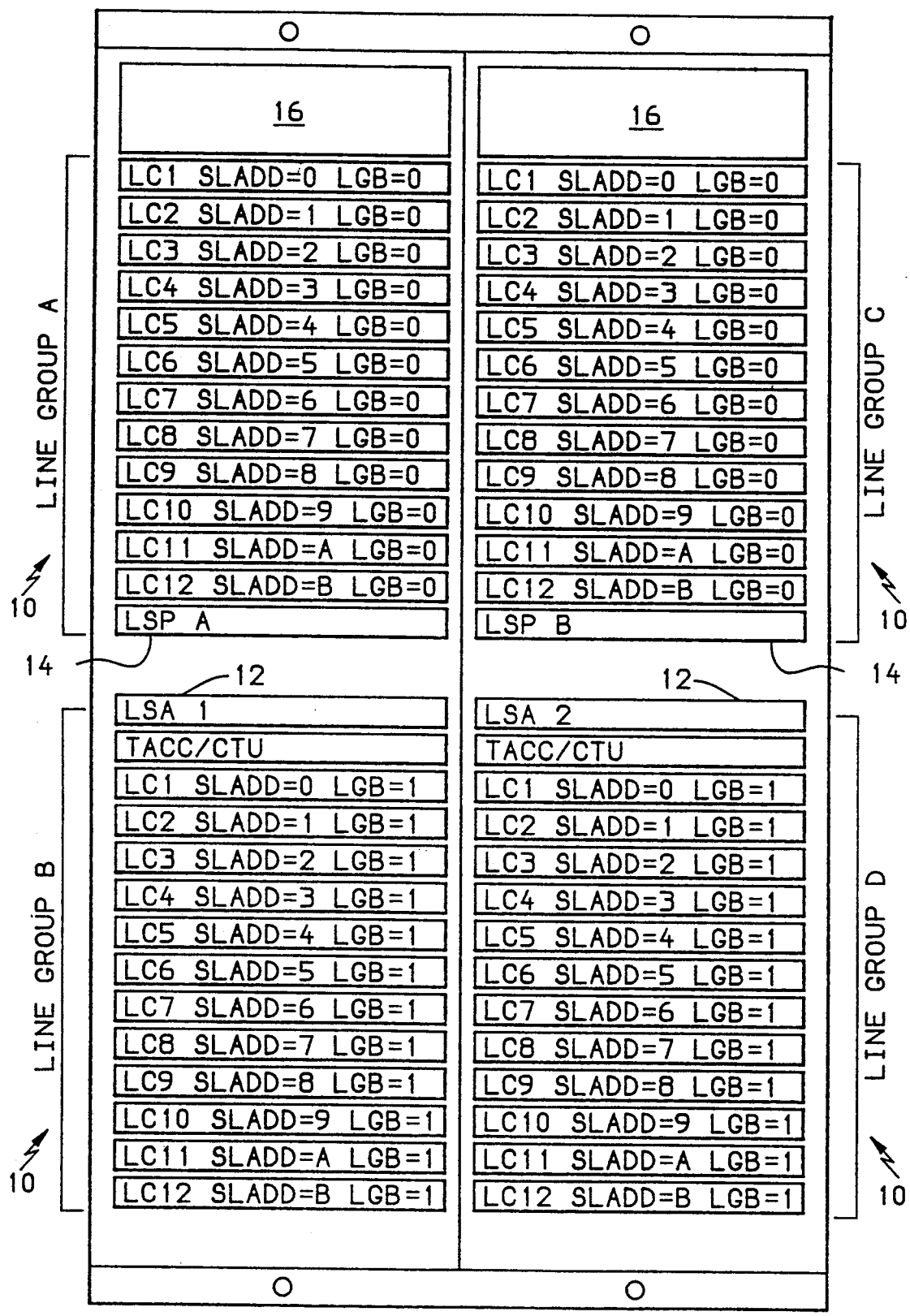
FIG. 1 is a front view of a line shelf utilizing the present invention.

FIG. 1 shows a typical arrangement of a line shelf having four groups of line units 10, each group consisting of 12 line units serving 24 separate subscriber lines in the case where each line unit includes two separate line circuits. Each line unit is inserted in a designated slot of the line shelf and is connected to backplane wiring.

A pair of line shelf access units (LSAs) 12 are arranged to each service two of the groups 10 of subscriber lines and function to multiplex the DS0-level subscriber lines of these groups to a transmission system bus. A pair of line shelf processors 14 are provided to control the LSAs 12 and the line units. Each processor has sufficient capacity to control the entire line shelf in the event of failure of the other processor. Thus, in normal operation, both processors work at less than full capacity. In the event of a failure, one processor can service the line shelf with only slightly degraded service. Two power supplies 16 are also provided, with one being redundant.

Figure 2:
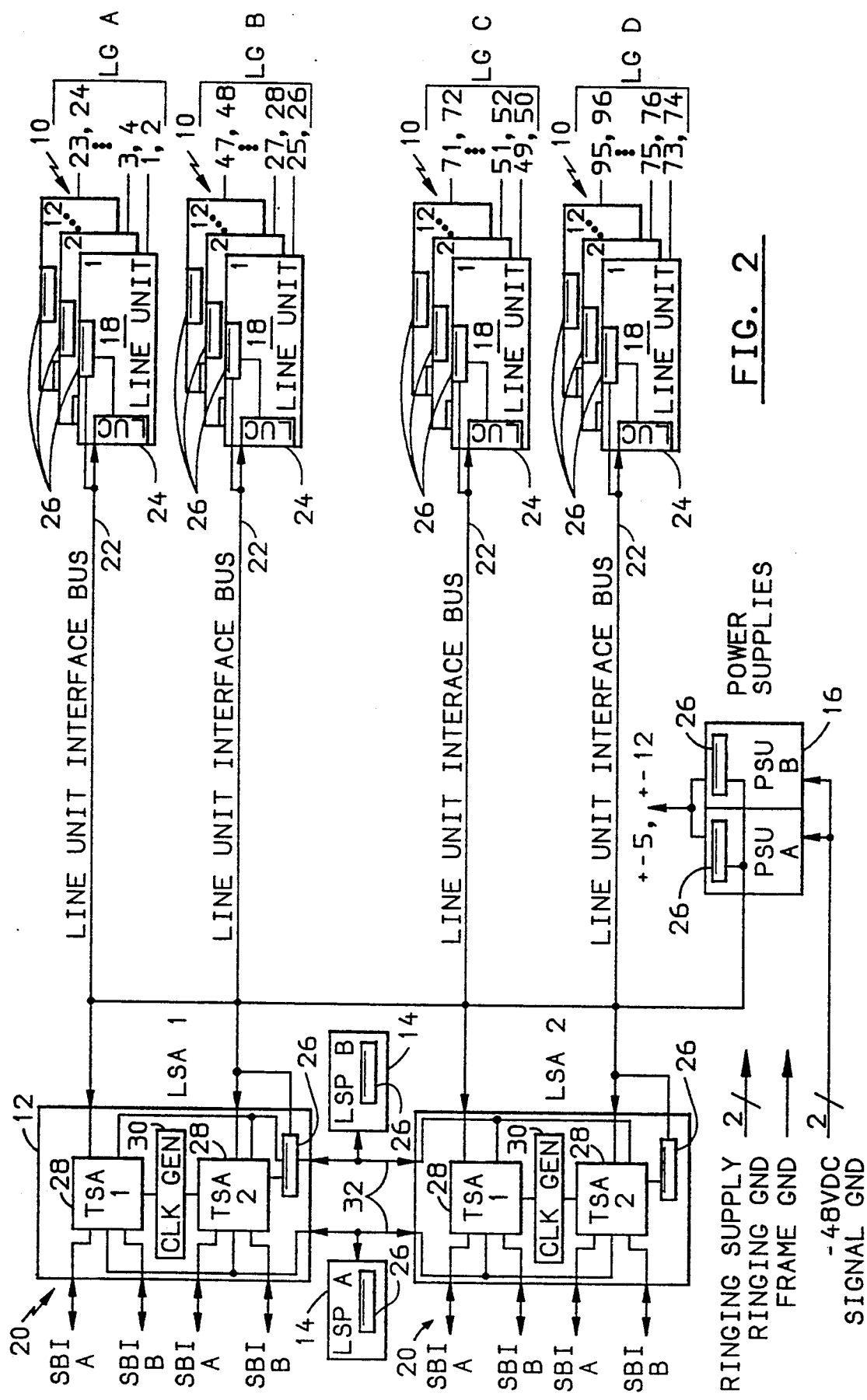
FIG. 2 is a block diagram of a line shelf in which the present invention is used.

Referring to FIG. 2, there is shown a block diagram of the line shelf of FIG. 1. Each line shelf is arranged with the four groups 10 of subscriber lines at the DS0 level. Each of the groups includes 12 line units (LU) 18, with most line units being capable of handling two subscriber lines so that a total of 96 subscriber lines may be handled by a line shelf. A pair of line shelf access units (LSAs) 12 are arranged to each service two of the groups 10 of the subscriber lines and function to multiplex the DS0 channels of these groups to a pair of serial interface buses (SBIs) 20, one of which is redundant.

The LSAs 12 are connected to the various line units 18 via line unit interface buses 22. The line unit interface buses 22 interface with a line unit interface circuit (LUC) 24 provided in each of the line units 18. The LUCs 24 perform all the functions necessary to interface the line unit interface of buses 22 with the LUs 18.

The LUs 18 are plugged into slots in the line shelf which have connectors to the line unit interface bus 22. The connectors have five pins that are selectively strapped to provide a 5-digit identification code for the slot and the subscriber lines on the plugged-in LU. The LSP periodically scans the various card positions and can detect when a card is plugged into an identified slot.

EEPROMs 26 are provided on each of the pluggable card units, such as the LUs, LSAs, LSPs and power supplies. The EEPROMs 26 provide storage for identification and inventory information about each card and other programmable data relating to the circuitry on each card.

The LSAs 12 each include two time slot access circuits (TSAs) 28 and a clock generator 30. The TSAs 28 are connected to each LSP 14 via LSP buses 32 and perform the following functions: reception and transmission of PCM signals on the SBI bus 20; collection of PCM digital information from the LUs and the LSPs; distribution of PCM information to LUs and the LSPs; generation of control information to indicate to the LUs which subscriber channel time slot is available on the various line unit interface buses 22; translation of signaling information between the SBI buses 20 and the LUs by utilization of RAM-based translation tables; LSP access in both read and write modes to all memory and control registers on the TSA, including access to the time slots of the line unit interface bus 22 and the SBI 20; control of EEPROMs on each plug-in unit; and provision of storage for information to be transmitted to and received from the various elements connected to the TSA.

Figure 3:
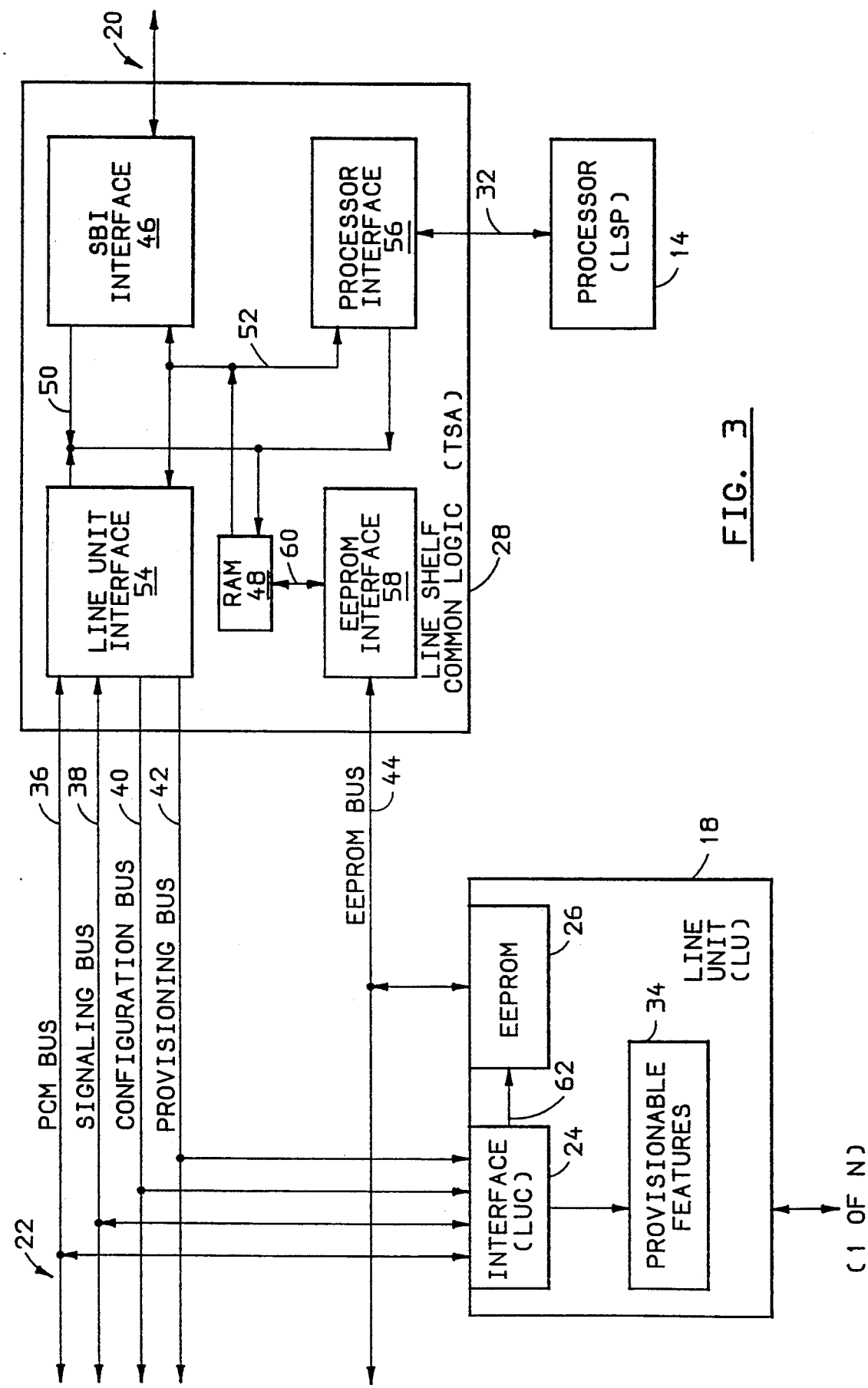
FIG. 3 is a block diagram showing specific features of an implementation of the present invention.

Referring to FIG. 3, there is shown in a more detailed block diagram the actual implementation of the present invention, as used in the line shelf shown in FIGS. 1 and 2. The line unit 18 is shown having an EEPROM 26 and an interface circuit (LUC) 24. The interface circuit (LUC) 24 is described in complete detail in U.S. patent application Ser. No. 07/451,436 filed Dec. 15, 1989, entitled "Line Unit Interface Circuit" and assigned to the assignee hereof. Said application is incorporated herein by reference. The EEPROM 26 is a 9346 type device, such as the ICT93C46 or the National Semiconductor NMC9346E devices. The EEPROM has the capability of storing 128 bytes each with 8 bits, for a total storage capability of 64 words of 16 bits each. The line unit 18 includes a plurality of provisionable features which are represented by a block 34. The provisionable features were mentioned heretofore and will be discussed in greater detail when the operation of the invention is described.

The line shelf common logic (TSA) 28 is described in complete detail in U.S. patent application Ser. No. 07/451,419 filed Dec. 15, 1989 and entitled "Apparatus for Programmably Accessing and Assigning Time Slots in a Time-Division Multiplex Communication System", which application is commonly assigned with the present application and is incorporated herein by reference. The TSA 28 provides the logic necessary to interface the SBI 20 with the line unit interface bus 22 and the LSP bus 32. The SBI 20 provides for the receipt and transmission of 32 channels of 16-bit serial data at a rate of 4.096 Mb/s arranged in a format to conform to that set forth in U.S. patent application Ser. No. 07/351,458 filed May 12, 1989 entitled "Serial Transport Frame Format Method", which application is commonly assigned and incorporated herein by reference.

The line unit interface bus 22 provides for the transmission and reception of information contained in 32 time slots each having eight bits for a data rate of 2.048 Mb/s. Bus 22 has five sub-buses for the transmission and reception of PCM data, signaling data and EEPROM data and for transmission from the TSA 28 to the line units 18 of configuration data and provisioning data. Thus, the line unit interface bus 22 comprises a PCM bus 36, a signaling bus 38, a configuration bus 40, a provisioning bus 42, and an EEPROM bus 44. These buses interconnect all of the line units with the TSA 28. The EEPROM bus 44 provides for the transmission and reception of data to and from the EEPROMs at a data rate of 256 Kb/s. Additionally, the EEPROM bus provides various strobes for EEPROMs used on the power supplies 16 and the LSAs 12.

The LSP buses 32 comprise a plurality of lines for providing address, data and control information between the TSA 28 and the LSP 14.

An SBI interface 46 is provided for receiving information in serial format in 32 time slots, each of 16 bits, at a rate of 4.096 Mb/s. The interface 46 reconstitutes the information into normal bipolar format, and the information is then fed to serial-to-parallel registers where each complete 16-bit word, including both speech and signaling, is captured and directed to the correct location in a RAM memory 48 via an internal RX bus 50. Information to be transmitted on the SBI 20 is transmitted from a 16-bit serial shift register in SBI interface 46, which is loaded from RAM 48 via an internal TX bus 52. The transmitted information consists of speech and signaling plus timing information and parity.

A line unit interface 54 is provided to interface four of the buses of the line unit interface bus 22 with the internal RX and TX buses 50 and 52. The line unit interface circuitry merely comprises a plurality of shift registers, including parallel-to-serial registers, timed to read out data to the line units and serial-to-parallel registers for receiving data from the line units.

A processor interface 56 provides access to the TSA 28 from the processor 14.

The RAM memory 48 essentially comprises two 512-byte RAMs, with one RAM being used to store data that is being communicated between the SBI 20, the line unit interface bus 22 and the LSP bus 32. The other of said RAMs is designated a connect memory and signaling RAM and provides storage for various channel control bits, signaling translation look-up tables, signaling memory and change information.

Access to the RAMs is time-division multiplexed on internal buses 50 and 52, so that effectively each RAM is multi-ported, so that the SBI 20 and line unit interface bus 22 may both be read from and written to simultaneously. In addition, the LSP may request a read or write of any location.

The TSA 28 includes an EEPROM interface 58 for interfacing the EEPROM bus 44 with a bus 60 connected to RAM 48. The interface 58 consists of a parallel-to-serial converter and timing logic. When the LSP 14 writes to this via bus 32, the data is serialized and placed on the EEPROM bus synchronously with the LUC generating an EEPROM enable. The EEPROM is read in a similar manner.

The operation of the various functions of the system will now be described. The processor scans all possible card slots, attempting to read the EEPROMs. The hardware is designed so that if there is no card in a specific slot, then a not-equipped code is read by the LSP. This is done by pull-up resistors on an EEPROM read line of bus 44 which will force an all 1s code if no EEPROM is present. When the LSP finds an installed card, indicated by a non all 1s response, it reads the contents of a specific location or locations in the EEPROM to determine the type of card installed. Knowing the type of card that is installed based on the stored CLEI code, and by reading other descriptive tags stored in the EEPROM, the LSP transfers control to specific software routines designed to initialize and provision the line unit with which the EEPROM is associated.

The TSA under control of the LSP facilitates a time slot assignment feature to provide assignment of a particular time slot to an LU. When performing the time slot assignment function, the LSP directs the TSA to transmit configuration data on the configuration bus 40, which data is sensed by the LUC 24 which functions to decode the configuration data. When a configuration code received on the configuration bus 40 matches a fixed code provided to the LUC by backplane straps connected to identification pins, access to a particular time slot on the PCM, and signaling and provisioning buses 36, 38 and 40 are provided. In addition, a chip select signal is generated by the LUC 24 and is provided to EEPROM 26 via line 62.

When the EEPROM 26 is activated by the chip select signal, the EEPROM can be addressed by the processor and EEPROM data can be read out serially at 256 Kb/s on the EEPROM bus 44. The output of the EEPROM, when activated, is tri-stated onto the EEPROM bus 44. The LSP 14 communicates with the EEPROM 26 through RAM 48 and EEPROM interface 58. Provisioning is accomplished by sending the necessary provisioning code from the processor to the line unit over the provisioning bus 42, which code is used to control the various provisionable features 34 on a line unit. The provisioning code may be exactly as stored in the EEPROM, such as in the case of gain or equalization settings; or it may be manipulated or supplemented by the LSP, such as in cases when operating code must be provided to the line unit. Thus, the various programmable features in a line unit may be provisioned, said features including electronically selectable balance networks, gain and equalization controls, time slot assignment, performance monitoring thresholds for ISDN.

The detailed procedure for reading and writing from and to the EEPROM is fully described in the aforementioned U.S. patent application Ser. No. 07/451,419.

The EEPROM is also provided with signaling translation tables, which tables are read from the EEPROM by the LSP and are written into RAM 48. RAM 48 is configured to hold signaling translation tables established on a channel-by-channel basis, so that the signaling, translation information from the EEPROM 26 is written to the translation table in RAM 48 at a location corresponding to the channel assigned to the line unit 18.

In operation, the signaling pattern generated by the line unit 18 is delivered to the TSA over the signaling bus 38. The signaling pattern is combined with a channel code and is used to address the translation tables stored in RAM 48. At the address the proper signaling pattern used by the DLC system, to which the SBI bus 20 is connected, may be read. The translation tables also work in the opposite direction to convert DLC signaling to line unit signaling.

This system provides unique flexibility, in that the software load contained in the LSP may be changed or updated so as to become compatible with new or proprietary signaling schemes that could be employed in future transmission systems. The new LSP software load could be used to modify the translation tables read from the EEPROM so they become usable with a new signaling scheme. Using this unique system, the LSP is relieved of a requirement to be actively involved in signaling translation and frees it to do other tasks.

As an example of the data which may be stored in an EEPROM, Table I provides a suggested format for the data required for a 2PD COT line unit.

TABLE I

| EEPROM DATA FOR 2PD COT | | |
|---|---|---|
| Byte # (H) | Data (H) | Description |
| 00 | 32 | Format 2 Least Significant Byte |
| 01 | 30 | Format 2 Most Significant Byte |
| 02 | 03 | Generic Unit Type--2PD/RT LS Byte |
| 03 | 00 | Generic Unit Type Continued MS Byte |
| 04 | 01 | Hit Filter Enable (7), (6 spare), On-Hook Type (5-4), Provisioning Type (3-0) |
| 05 | 0A | (7-6 spare), DS0s/line (5-3), Lines/Unit (2-0) |
| 06 | 00 | Gain Code 1 |
| 07 | 00 | Gain Code 2 |
| 08 | 03 | Line Conditioning Code 1 |
| 09 | 03 | Line Conditioning Code 2 |
| 0A | 00 | Signaling Translate Table (7-4 value for SBI) |
| 0B | 20 | (3-0 value for Line Unit) |
| 0C | 20 | |
| 0D | 20 | |
| 0E | 20 | |
| 0F | 50 | |
| 10 | 20 | |
| 11 | 20 | |
| 12 | 98 | |

TABLE I-continued

| EEPROM DATA FOR 2PD COT | | |
|---|---|---|
| Byte # (H) | Data (H) | Description |
| 13 | 28 | |
| 14 | 28 | |
| 15 | B8 | |
| 16 | 28 | |
| 17 | 28 | |
| 18 | E4 | |
| 19 | F8 | |
| 1A | FF | Auto-Provisioning Data Value 1 |
| 1B | FF | Auto Provisioning Data Value 2 |
| 1C | FF | Auto Provisioning Data Value 3 |
| 1D | FF | Auto Provisioning Data Value 4 |
| 1E | FF | Spare Byte 1 |
| 1F | FF | Spare Byte 2 |
| 20 | FF | Spare Byte 3 |
| 21 | FF | Spare Byte 4 |
| 22 | 31 | Supplier Code Byte 1 |
| 23 | 32 | Supplier Code Byte 2 |
| 24 | 31 | Serial Number Byte 1 |
| 25 | 32 | Serial Number Byte 2 |
| 26 | 33 | Serial Number Byte 3 |
| 27 | 34 | Serial Number Byte 4 |
| 28 | 35 | Serial Number Byte 5 |
| 29 | 36 | Serial Number Byte 6 |
| 2A | 37 | Serial Number Byte 7 |
| 2B | 38 | Serial Number Byte 8 |
| 2C | 31 | CLEI Code Byte 1 |
| 2D | 32 | CLEI Code Byte 2 |
| 2E | 33 | CLEI Code Byte 3 |
| 2F | 34 | CLEI Code Byte 4 |
| 30 | 35 | CLEI Code Byte 5 |
| 31 | 36 | CLEI Code Byte 6 |
| 32 | 37 | CLEI Code Byte 7 |
| 33 | 38 | CLEI Code Byte 8 |
| 34 | 39 | CLEI Code Byte 9 |
| 35 | 30 | CLEI Code Byte 10 |
| 36 | 31 | Issue Letter 1 |
| 37 | 32 | Issue Letter 2 |
| 38 | 30 | Program Date First Digit Month |
| 39 | 35 | Second Digit Month |
| 3A | 31 | First Digit Day |
| 3B | 39 | Second Digit Day |
| 3C | 38 | First Digit Year |
| 3D | 39 | Second Digit Year |
| 3E | | Write Protected Checksum Byte |
| 3F | FF | Spare Byte |

As shown in Table I, the translation data is stored in the EEPROM at address "0AH-19H". The data stored at 0AH corresponds to the signaling data to be written into the first location of the translation table in systems employing the initial signaling scheme. Data stored at "0BH" is then used for the next location, etc. for all 16 locations. Sixteen separate signaling patterns can be supported with ABCD signaling schemes, and pattern storage locations are provided.

If a signaling scheme other than the initial scheme is required, then a conversion must take place before writing the data into the translation table. The data read from the EEPROM is used to address a table in software that converts the initial signaling pattern to the pattern required by the system being implemented. There is a separate conversion table for each basic line unit type supported by the initial signaling scheme. If new functions are required, then a different basic card type is created, and the initial system signaling definitions may be expanded to support the new functionality that was missing from the previous system. Since existing systems would not support signaling for these units, retrofitting is not required for systems already deployed.

In addition to the signaling translation, initialization and provisioning previously described, the EEPROM is programmed to store other pertinent information, such as:

1. Generic Unit Type (16 bits)—allows software to interpret the signaling information associated with a given line unit.
2. Hit Filter Enable—a provisionable item allowing hardware filtering of signaling changes. Some cards require filtering of loop current detection, while other units do not. This allows the information concerning the particular units needs to be made available to the software for selecting or deselecting the filter.
3. On-Hook Transmission Method—since various LUs may require different methods of enabling or disabling On-Hook transmission, this data allows the software to select the proper routines necessary.
4. Provisioning Type—because different LUs may provide for different interfaces to the LSP for provisioning of various parameters, this data can be used to select the proper software routines needed for that particular unit.
5. DS0s per Line—with the advent of high bandwidth LUs (7Khz services, etc.), this data can be used to determine how many DS0s are needed to provide service for each unit on this card. In a concentrating system this data is necessary.
6. Lines per Unit—as indicated in 5., the system must be configurable to route the necessary facility DS0s required by each LU. This data can be used to support the routing of the facility DS0s to the proper LUs.
7. Gain Codes 1 and 2—on the four-wire FXS and FXO LUs can be read from the EEPROM and used to provision the FXS or FXO LUs so that no factory selected components need to be inserted.
8. Line Conditioning Codes 1 and 2—TR-TSY-000057 specifies a series of signaling outputs or just one signaling output to apply when a system failure occurs. When a system failure occurs, the first code is sent to the LU for two seconds, and then the second code is sent for the remainder of the system failure. This allows the software to be ignorant of the pattern required by the particular LU that is to be conditioned.
9. Auto Provisioning Data—a block of data is reserved in the EEPROM for default provisioning data. This data is sent to the LU sequentially to provide it with the necessary default information to configure itself and be brought into service without provisioning information being supplied by the craftsperson. An example is selection of the appropriate balance network.

By having access to the EEPROM on the LUs, the software can detect insertions and removals of LUs by checking the card type information stored in the EEPROM. If the card is not present, then an FFFFH pattern is read. If a card is present, then a valid unit type value is read.

Reads and writes take place on the EEPROM bus. Chip select is via the configuration bus. There are in addition two extra direct chip selects from each TSC which can be used to strobe EEPROMs. These are used for power supply inventory.

Finally, the system provides a means of retrieving inventory information electronically from a remote location. The EEPROM contains this information in ASCII representation so the software can read the data and pass it along to the craft interface without having to interpret the data. This provides for an accurate method of determining which LUs are equipped, along with appropriate inventory information such as serial number and CLEI code.

In the event of an LU failure, the program data is available to provide maintenance data so that MTBF information can be accumulated.

More uses may be added to the list above as design and upgrades continue. Utilization of EEPROMs allows for field upgrades of the data as well as non-volatility. One possible upgrade that might be incorporated is the selection of balance network provisioning routines in software.

What is claimed is:

1. A telephone line unit for use in a line shelf having common logic, a processor unit and a plurality of line units connected to the common logic via a line unit interface bus, said telephone line unit including:
   means for interfacing with said line unit interface bus;
   provisionable means for providing selected line unit features; and
   a programmable read-only memory for storing specific provisioning data for the selected line unit features, including gain and equalization level settings specific to the line unit.

2. A telephone line unit as described in claim 1, wherein the programmable read-only memory stores auto provisioning data which functions as default provisioning for the line unit.

3. A telephone line unit as described in claim 1, wherein the programmable read-only memory stores inventory data identifying the line unit type and wherein the inventory data includes a CLEI code for the line unit.

4. A telephone line unit as described in claim 1, wherein the programmable read-only memory stores the installation date so that time in service can be calculated for warranty and maintenance purposes.

5. A method of operating a line shelf in a telecommunications system, wherein said line shelf includes common logic, a line shelf processor, slots for receiving line units, and a plurality of buses interconnecting the common logic with the slots for receiving line units, said line units each having a programmable read-only memory, with line unit identification data stored therein, said method comprising the steps of:
   scanning said slots with the processor and attempting to read line unit identification data at each slot;
   reading line unit identification data from the programmable read-only memory of a newly-installed line unit;
   activating initialization and provisioning software stored in said line shelf processor for the line unit in accordance with the identification data read from the line unit;
   writing provisioning data to said line unit over the line unit interface bus.

6. A method as described in claim 5, wherein the programmable read-only memory has stored therein data relating to gain and equalization requirements for the line unit, said method additionally comprising the steps of:
   reading the gain and equalization data from the programmable read-only memory by the line shelf processor; and writing the gain and equalization data to provisionable features contained within the line unit requiring the gain and equalization data.

7. A telephone line unit for use in a line shelf having common logic, a processor unit and a plurality of line units connected to the common logic via a line unit interface bus, said telephone line unit including:
   means for interfacing with said line unit interface bus; and
   a programmable read-only memory for storing information specific to the line unit, including a date indicative of data of installation of the line unit in the line shelf, so that time in service can be determined.

8. The line unit of claim 7, wherein the memory stores inventory data identifying the line unit type and wherein the inventory data includes a CLEI code for the line unit.

9. The line unit of claim 7, further comprising provisionable means for providing selected line unit features and wherein the memory stores specific provisioning data for the selected line unit features, including gain and equalization level setting specific to the line unit.

* * * * *